US011640506B2

(12) United States Patent
Firat et al.

(10) Patent No.: US 11,640,506 B2
(45) Date of Patent: May 2, 2023

(54) ENTITY DISAMBIGUATION

(71) Applicant: Runtime Collective Limited, Brighton (GB)

(72) Inventors: Aykut Firat, Cambridge, MA (US); Karim Abdul Munaff, Quincy, MA (US); Christopher Bingham, Cambridge, MA (US)

(73) Assignee: RUNTIME COLLECTIVE LIMITED, Brighton (GB)

( * ) Notice: Subject to any disclaimer, the term of this patent is extended or adjusted under 35 U.S.C. 154(b) by 250 days.

(21) Appl. No.: 16/861,564

(22) Filed: Apr. 29, 2020

(65) Prior Publication Data

US 2021/0342540 A1 Nov. 4, 2021

(51) Int. Cl.
| | |
|---|---|
| *G06F 40/295* | (2020.01) |
| *G06F 16/33* | (2019.01) |
| *G06F 16/93* | (2019.01) |
| *G06F 40/237* | (2020.01) |
| *G06F 40/30* | (2020.01) |
| *G06F 16/35* | (2019.01) |

(52) U.S. Cl.
CPC ........ *G06F 40/295* (2020.01); *G06F 16/3347* (2019.01); *G06F 16/353* (2019.01); *G06F 16/93* (2019.01); *G06F 40/237* (2020.01); *G06F 40/30* (2020.01)

(58) Field of Classification Search
CPC .. G06F 40/295; G06F 16/3347; G06F 16/353; G06F 16/93; G06F 40/284; G06F 40/30; G06F 40/10; G06F 40/20; G06F 40/40; G06F 16/30; G06F 16/60; G06F 16/70; G06F 40/279; G06F 40/232; G06F 16/35; G06F 16/3344; G10L 15/22; G10L 21/06
See application file for complete search history.

(56) References Cited

U.S. PATENT DOCUMENTS

| | | | | |
|---|---|---|---|---|
| 10,162,886 | B2* | 12/2018 | Wang | G06F 16/334 |
| 10,460,229 | B1* | 10/2019 | Yuan | G06F 40/268 |
| 2021/0326525 | A1* | 10/2021 | Kwon | G06F 40/279 |

OTHER PUBLICATIONS

Seo et al, Unsupervised word sense disambiguation using wordnet relatives, Computer Speech and Language 18 (2004), Jun. 9, 2004 pp. 253-273 (Year: 2004).*

(Continued)

*Primary Examiner* — Linda Wong
(74) *Attorney, Agent, or Firm* — Mintz Levin Cohn Ferris Glovsky and Popeo, P.C.

(57) ABSTRACT

Data characterizing a document including a target word and a plurality of potential meanings for the target word is received. A first set of context words is determined using a language model. The first set of context words is for the target word. A second set of context words is determined using a knowledge base and the language model. The second set of context words is for the plurality of potential meanings of the target word. A score is determined for each of the plurality of potential meanings by at least comparing the first set of context words and the second set of context words. A potential meaning selected from the plurality of potential meanings that has a highest score is selected as a disambiguation of the first word. Related apparatus, systems, techniques and articles are also described.

15 Claims, 8 Drawing Sheets

(56) References Cited

OTHER PUBLICATIONS

Banerjee et al, An Adapted Lesk Algorithm for Word Sense Disambiguation using Wordnet, 2002, https://www.d.umn.edu/~tpederse/Pubs/cicling2002-b.pdf (Year: 2002).*

Moldovan et al, Word sense disambiguation of WordNet glosses, Computer Speech and Language 18 (2004), Jun. 9, 2004, pp. 301-317 (Year: 2004).*

Kwon et al, Word sense disambiguation based on context selection using knowledge based word similarity, Information Processing and Management 58 (2021) 102551. Mar. 4, 2021 (Year: 2021).*

* cited by examiner

Figure 4. Different Search Modes

ENTITY DISAMBIGUATION

TECHNICAL FIELD

The subject matter described herein relates to entity disambiguation.

BACKGROUND

In some fields of artificial intelligence, such as natural language processing, large amounts of natural language data, such as those included in documents, can be processed. For example, natural language data may be processed in applications of natural language processing, such as speech recognition, natural language generation, and/or the like. In these applications, the natural language data can include references to entities, or named entities, for which one or many strings, such as words or phrases, stand fairly consistently for some referent. For example, named entities can include people, places, organizations, and/or the like.

As an example, a document can include the sentence "Paris is a city in France." The sentence, "Paris is a city in France," can include the entities "Paris", "is", "a", "city", "in", and "France" and the named entities "Paris" and "France". In named entity recognition, the task can be to associate each named entity with a predetermined category. As such, for example, the named entity "Paris" can be associated with the category "City" and the named entity "France" can be associated with the category "Country." However, even when recognized as a named entity and associated with a category, there can be some ambiguity as to the specific meaning of a given entity.

SUMMARY

In an aspect, data characterizing a document including a target word and a plurality of potential meanings for the target word is received. A first set of context words is determined using a language model. The first set of context words is for the target word. A second set of context words is determined using a knowledge base and the language model. The second set of context words is for the plurality of potential meanings of the target word. A score is determined for each of the plurality of potential meanings by at least comparing the first set of context words and the second set of context words. A potential meaning selected from the plurality of potential meanings that has a highest score is selected as a disambiguation of the first word.

One or more of the following features can be included in any feasible combination. For example, the determining the first set of context words can include providing, to the language model, the document or a portion of the document along with a suffix. The language model can characterize the target word. The determining the first set of context words can include providing, to the language model, the document or a portion of the document in which the target word is masked. The language model can output replacement words for the target word. Each context word in the first set of context words can be represented as a vector. The determining the score for each of the plurality of potential meanings can be by at least comparing the first set of context words and the second set of context words includes clustering context words of the first set of context words and clustering the second set of context words to determine a similarity between the target word and each of the plurality of potential meanings.

The plurality of potential meanings for the target word can be determined using the knowledge base. The second set of context words can be determined using input sentences and the language model. The first set of context words can be stored in a database. The determining the second set of context words and/or the determining the score for each of the plurality of potential meanings can be performed after receiving a query by a user for a disambiguation of the target word.

In another aspect, data is received characterizing a document including a first entity. A first replacement entity for the first entity is predicted using a language model. A first candidate entity characterizing a first potential meaning of the first entity is determined using the first replacement entity and a knowledge base. The first replacement entity and the first candidate entity is compared. The first potential meaning characterized by the first candidate entity is provided as a disambiguation of the first entity.

One or more of the following features can be included in any feasible combination. For example, the language model can be trained on a corpus. The first replacement entity can correspond to a first replacement entity word vector. The first candidate entity can correspond to a first candidate entity word vector. The first candidate entity word vector can be associated with a dominate candidate cluster based on a proximity of the first candidate entity word vector within a word vector space. The comparing can be performed within the word vector space. The comparing can include comparing the first replacement entity word vector and the first candidate entity word vector associated with the dominant candidate cluster. The document can further include a left context and a right context, the left context including entities in the document preceding the first entity, the right context including entities in the document succeeding the first entity. The language model can be a staggered bidirectional language model. The first replacement entity can be predicted to complete a phrase including the left context followed by the first replacement entity followed by the right context.

The first replacement entity word vector can be generated using the first replacement entity. The first candidate entity word vector can be generated using the first candidate entity. The first replacement entity word vector and the first candidate entity word vector can be graphed within the word vector space. The first candidate entity word vector can be clustered, using a graph clustering algorithm, into a first candidate cluster. A set of candidate entities including the first candidate entity and corresponding to a set of candidate entity word vectors can be determined using the first replacement entity and the knowledge base. That the first candidate cluster is the dominant candidate cluster can be determined based on the proximity of the first candidate entity word vector to other candidate entity word vectors in the set of candidate entity word vectors. The first potential meaning characterized by the first candidate can be associated with the dominant candidate cluster.

The graph clustering algorithm can include agglomerative algorithms, divisive algorithms, relocation algorithms, probabilistic clustering, k-medoids algorithms, k-means algorithms, density-based connectivity clustering, density functions clustering, grid-based clustering, subspace clustering, and/or co-clustering. A first distance between the first replacement entity word vector and the first candidate entity word vector can be determined. The first distance can be less than distances between the first replacement entity word vector and the other candidate entity word vectors in the dominant candidate cluster. The first potential meaning associated with the dominant candidate cluster can be provided as the disambiguation of the first entity in response to determining the first distance is less than the distances.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 6 is an example Wikipedia document;

Like reference symbols in the various drawings indicate like elements.

DETAILED DESCRIPTION

In natural languages, entities, such as words, can include speech sounds or sets of linguistic forms that symbolize or communicate meaning, such as a logical connotation or denotation. But some entities can be open to more than one interpretation. For example, the entity "Paris" can be interpreted as a surname, a given name, a prince of Troy in Greek mythology, one of five different movies, a band, a rapper, one of two musicals, various music albums, various songs, a plant, a computer processor, a casino, a soccer team, various cities around the world, and so on.

In named entity recognition, the entity, such as "Paris", can be categorized based on its context in a sentence, such as "Paris is a city in France." As such, "Paris" can be associated with the category "city." However, as noted above, there are various cities around the world called "Paris", such "Paris, Ontario, Canada" and "Paris, France." As such, at least some ambiguity remains when the entity "Paris" is associated with the category of "city". In addition, there are various cities within the United States named "Paris," such as in Arkansas, Idaho, Illinois, Missouri, New York, and so on. As such, it can be desirable to link an entity with a unique interpretation.

In named entity disambiguation, also referred to as entity linking, a given entity can be associated with a uniquely intended explicit referent. For example, in the sentence "Paris is a city in France," the entity "Paris" can be associated with the referent uniquely identifying the city "Paris, France". The referent can include an identifier not open to more than one interpretation and can be derived from a knowledge-base. For example, the referent can include a link to an entry in a knowledge base, such as a WIKIPEDIA entry uniquely identifying the disambiguated named entity, such as the capital of France "https://en.wikipedia.org/wiki/Paris" or the prince of Troy "https://en.wikipedia.org/wiki/Paris_(mythology)". However, linking a named entity to an explicit referent can be cumbersome. And in some cases, such as the sentence "Paris is a city in the United States," the linked referent may not correspond with the intended meaning of the entity. As such, it can be desirable to provide a more accurate disambiguation of named entities.

In some implementations of the current subject matter, named entities can be disambiguated by using a language model. Text containing the entities can be augmented with one or more suffixes. For example the text "I like to drive my Malibu fast." can be augmented with the suffix "Malibu is type of" for the entity Malibu. The augmented sentence, "I like to drive my Malibu fast. Malibu is a type of" is then sent to a language model which suggests words that can complete the sentence. For example, the language model may come up with "I like to drive my Malibu fast. Malibu is a type of car" or "I like to drive my Malibu fast. Malibu is a type of model" or "I like to drive my Malibu fast. Malibu is a type of brand". It is possible to refer to "car", "model", and "brand" words, which are generated by the language model, to complete the input sentence as context words.

In some implementations of the current subject matter, named entities can be disambiguated by using a bi-directional language model. Text containing the entity of interest is sent to the language model by masking the entity reference. For example the text "I like to drive my Malibu fast." is sent to a bi-directional language model for the entity Malibu by masking it. The bi-directional language model then suggests words in place of the <mask> for the masked sentence, "I like to drive my <mask> fast". For example, the language model may come up with "I like to drive my car fast." or "I like to drive my Ferrari fast." or "I like to drive my motorcycle fast." The words "car", "Ferrari", and "motorcycle", which are generated by the language model to complete the input sentence, can be also considered as context words.

A knowledge-base can be used to come up with a list of candidates for an ambiguous word such as Malibu, and together with a language model to derive context words associated with each candidate. Sample sentences from the knowledge base that are known to refer to a specific entity can be sent to a language model using the above-described methods, and the context words can be accumulated, and sorted to come up with candidate context words. In addition to sample sentences collected from the knowledge base, or in place of them, sentences that are known to refer to a specific entity can also be used. For a given text and an entity of interest, candidate context words can then be compared with the context words obtained from the input sentence and entity of interest. A score with each candidate can be calculated based on the similarity of candidate context words and the sentence context words.

In some implementations of the current subject matter, graph clustering on input sentence context words and candidate context words can be used to calculate the scores for each candidate meaning. Vector representations, also known as embeddings, can be utilized to represent each word, and cluster in calculating these scores.

In some implementations of the current subject matter, for large document databases, or document streams such as tweets coming from Twitter, context words for ambiguous terms in input documents can be directly stored in an index (loosely-coupled implementation) delaying the assignment of an ambiguous term to a specific entity until it is queried, at which time candidate context words are used to calculate a score. This implementation strategy can be extensible (e.g., new entities can be added easily without incurring large costs such as reindexing) and accessible (users can see through the algorithm and modify entity definitions for their use case). It can also enable a smart search use-case by allowing users to directly search the context words stored in the index.

In some implementations of the current subject matter, for large document databases, or document streams such as tweets coming from Twitter, context words for ambiguous terms in input documents can be compared to candidate context words and scores can be stored in an index (tightly-coupled implementation).

In some implementations of the current subject matter, both context words for ambiguous terms in input documents can be directly stored in an index (e.g., loosely coupled approach) and context words for ambiguous terms in input documents can be compared to candidate context words and scores can be stored in an index (tightly-coupled implementation) can be performed simultaneously.

Although some aspects of the current subject matter are described with respect to named entities, the current subject matter can be applied to any entity and not just named entity.

As noted above, searching text can be difficult in the presence of homonyms: words having the same spelling but different meanings. In some current approaches, when a user wants to analyze content around a homonym, for example a brand like Target Corporation, they need to go through the painstaking process of writing elaborate boolean queries to weed out unwanted meanings of the term. This process is often very hard, labor intensive, and inconsistent.

Some implementations of the current subject matter enable users to simply indicate what entity they want to search for with the help of a knowledge base, and the current subject matter can bring content that matches that entity. The accuracy of the results can depend on the difficulty of the homonym. In some implementations, the user can fine-tune their results with a trade-off between precision and recall.

One major complication in designing an ED system can include determining the meaning space of a homonym. Sometimes there can be numerous possible entities even though many of them are obscure and rarely encountered. Including all possible entities can deteriorate the discrimination power of a classification system unless the prior probabilities of each are well estimated. Prior probabilities can indicate how likely one is to encounter each entity, and can make classification better by demanding more evidence from the rare meaning classes. Prior probabilities, however, may not be static and can depend on the context. It can be a challenge to select a subset of entities for a homonym that will be most useful to users. Furthermore, the meaning space of a homonym can be dynamic, for example, a new brand can be announced, a new song can be released, and new meanings can be constantly added.

In a tightly-coupled implementation of ED, one can select a canonical subset of candidate entities for homonyms and decide what a homonym refers to before storing it in a database. But such an approach may be less advantageous than the loosely coupled approach because a user who is interested in searching for an entity that is not in the canonical set would not be able to use such a system, and it can be expensive and impractical to modify such a system in the continuous evolution of user demands and emergence of new meanings.

Some implementations of the current subject matter can include utilizing the loosely coupled approach, which can delay the assignment of a homonym to an entity until query time. In some implementations, only a set of features, such as context words, can be stored in a database at ingestion time for homonyms in input sentences. When the user queries the system, matching can be performed at runtime (e.g., on the fly). Compared to a tightly coupled system, such an approach can incur the cost of running the match algorithm with each query in exchange for extensibility and accessibility. This approach can be extensible, because the approach includes the ability to incorporate changes in a graceful manner; in particular, local changes such as emergence of new meanings will not have adverse effects on other parts of the larger system. A system according to this approach can also be accessible because of its flexibility in supporting different kinds of queries by users. The users can operate with an emergent or an obscure meaning of an entity, custom define or modify entities based on their use-case. Furthermore, when a new use case emerges, users can directly search the features stored in the database for purposes other than entity disambiguation.

In some implementations, features are stored in databases for each homonym instead of hard assignments that require fixing the set of entities to discriminate between beforehand. In some implementations, the features can include context words and occurrence probabilities.

Figure 1:
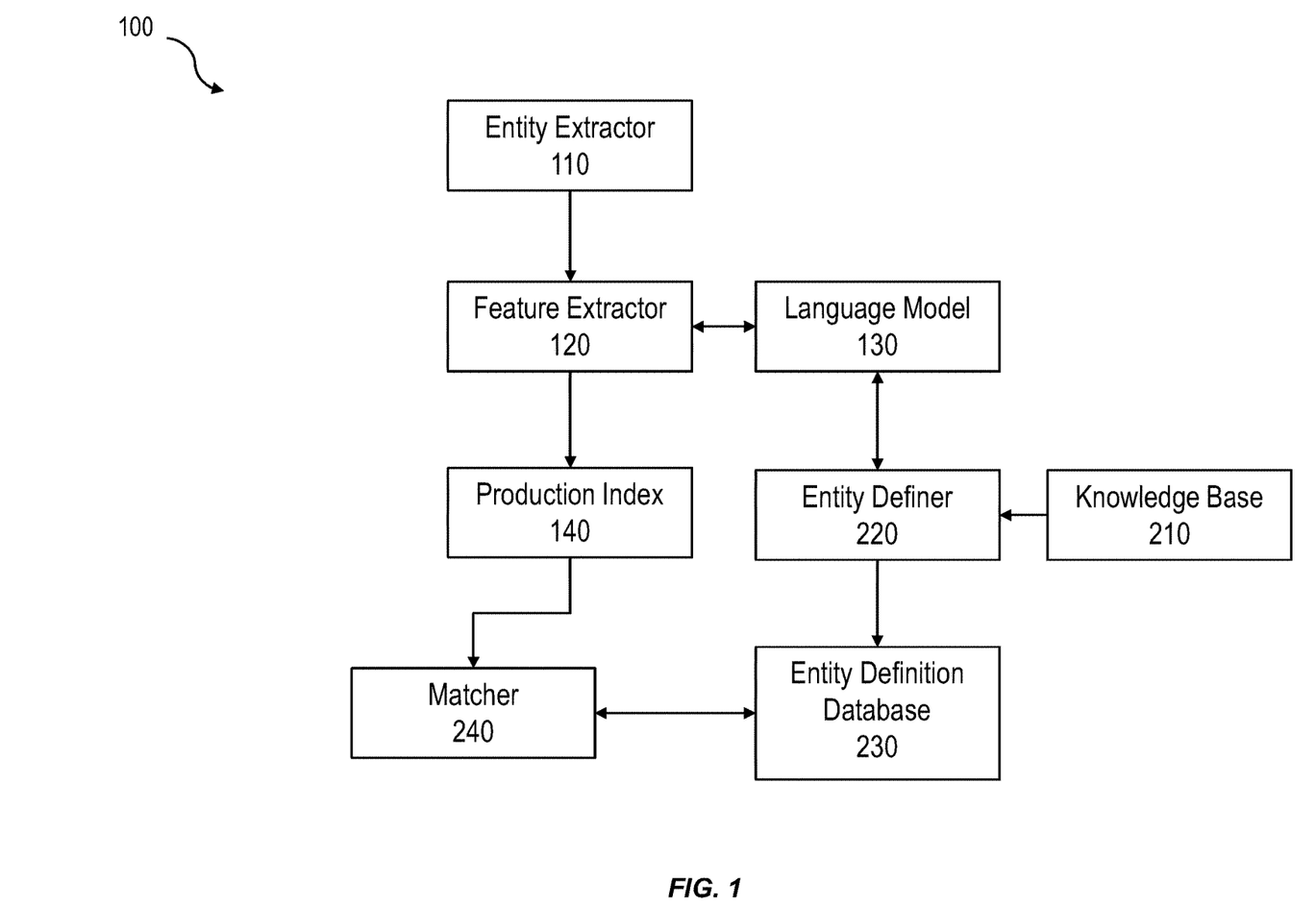
FIGS. 1-3 are system block diagrams illustrating an example system for enabling disambiguation of named entities.
Figure 2:
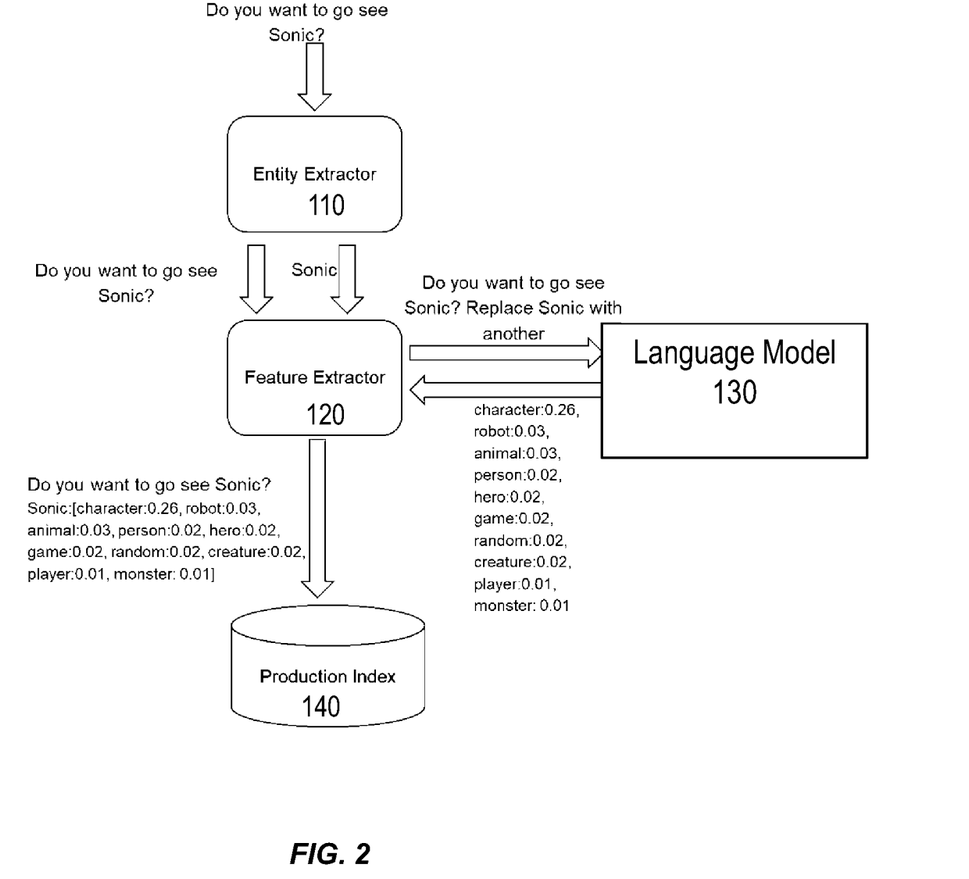
Figure 3:
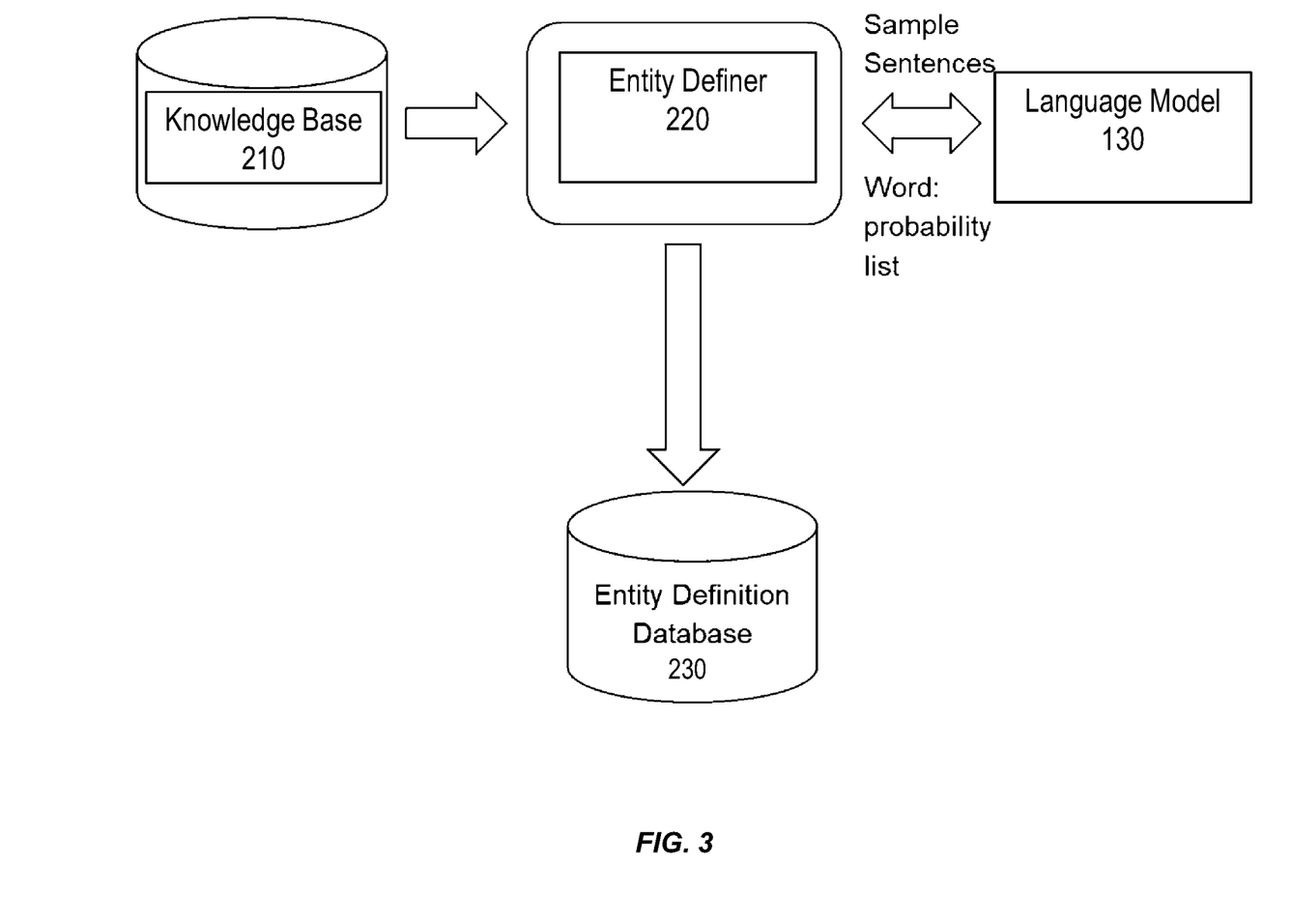

FIGS. 1-3 are system block diagrams illustrating an example system 100 for enabling disambiguation of entities. The example system 100 includes an entity extractor 110, a feature extractor 120, a language model 130, a production index 140, an entity definer 220, a knowledge base 220, an entity definer 230, and a matcher 240.

In some implementations, the language model 130 can include unidirectional or bidirectional language models such as those generated by deep learning approaches. The language model 130 can be utilized to extract the context words for inputs and to define entities.

The knowledge base 210 can include data sources such as Wikipedia, which can act as a dictionary of entities as well as providing example sentences for each entity. Depending on the specific knowledge base used, the knowledge base 210 can be accessed, e.g., via a web interface, application programming interface (API), and the like.

Entity extractor 110 can be responsible for identifying words or phrases to disambiguate in an input sentence. It can use part of speech information, as well as frequency of words and the knowledge base 210 (e.g., Wikipedia titles) among other information. Input to the entity extractor 110 can include text, and the output can include a list of words or phrases with their start and end indices.

For example,
Input: Do you want to go see Sonic?
Output: [(Sonic,22,26)]
Input: Greg Hunter has nearly 9 years network experience as an investigative correspondent for CNN, ABC News, Good Morning America & blogs regularly @USAWatchdog.com
Output: [(Greg Hunter,0,10),(CNN,88,90), (ABC News, 93,100), (Good Morning America,103,122)]
Input: I like to drink coke, but I do not like to snort coke.
Output: [(coke,16,19),(coke,49,52)]

Feature extractor 120 can perform feature extraction for inputs. To extract features for a target word in an input sentence, for example: (Input Sentence: Do you want to go see Sonic?; Target word: (Sonic,22,26)), the feature extractor 120 can send the following transformed sentence to our language model 130: (Transformed sentence: Do you want to go see Sonic? Sonic is a type of). This transformed new sentence influences the LM to output what type of a thing our target word is. Different type of suffixes such as "Replace <target word> with another", "<target word> is a type of", "<target word> is a" can be used.

In some implementations, the top N words (for example 30) LM suggests can be obtained as the continuation of the transformed sentence. A filtering of these 30 words can be performed by eliminating very common words, adjectives, and the like, and obtain a smaller number of remaining words (for example 10) along with occurrence probabilities as context words.

In the above Sonic example, the following top 10 words and probabilities can be obtained:
character:0.26
robot:0.03
animal:0.03
person:0.02
hero:0.02
game:0.02
random:0.02
creature:0.02
player:0.01
monster: 0.01

In some implementations these words and probabilities can include the features that are stored and accessed at retrieval time. In implementations utilizing indexing, these features can be indexed for a target word.

With respect to the entity definer 220, the knowledge base 210 (e.g., Wikipedia) can be used to refer to entities. Each entity can be reduced to a number of words associated with it using the LM 130. In order to generate associated words for an entity, example sentences can be needed in which the entity of interest is mentioned. These example sentences can be obtained from the knowledge base 210 (e.g., Wikipedia) by collecting hyperlinks to the desired entity. In some implementations in which the knowledge base 210 includes Wikipedia, the first sentence from an entity's Wikipedia page can always be included in a list, so an example will exist for all entities with a Wikipedia page.

The entity definer 220 then sends these sentences to the language model 130 by adding a suffix. The target word used in these sentences may not necessarily be ambiguous. For example, the sentence may contain the reference Coca-Cola instead of the homonym coke. In some implementations, this can be preferred as a goal is to minimize the noise in this step.

If the example sentences often use the ambiguous reference, however, the LM 130 may, in some implementations, be biased towards the dominant meaning of the term, especially when the context does not aid in disambiguation. To lessen this problem, and to accumulate a cleaner description of entities, some implementations can adopt a weighted accumulation scheme. In this scheme, a reference list of words is needed that are more certainly known to be associated with the entity. This reference list can be collected from the knowledge base 210, for example, from Wikipedia and Wikidata. More specifically, in some implementations, the nouns and proper nouns can be determined from the title, first sentence, and first paragraph of the entity Wikipedia page, as well words from its type hierarchy and description from Wikidata. When the language model 130 returns a list of words, a quality weight can be assigned to the list based on how much overlap there is between that and the reference list. A post-filtering step can be employed that can eliminate words that belong to competing entities detected with the following example logic: eliminate a word if it does not exist anywhere in the reference list of an entity, but exists in the top 10 words of the competing entity reference lists. The competing entities can be currently the top 10 most important entities hyperlinked with the same ambiguous term based on link frequency. Other implementations to identify top entities associated with a homonym are possible.

In the Sonic example some of the competing entities are annotated in FIG. 6, which is a screen shot of an example Wikipedia document 600.

In the example, Wikipedia Disambiguation pages may not have every related entity that is hyperlinked with a homonym. For example, in the Sonic example, sound and sonic logging are entities that are hyperlinked but may not exist in the Wikipedia disambiguation page.

Using an example implementation of entity disambiguation as described herein can result in entity definitions for the Sonic homonym (a sample is shown): (The numbers next to words only influence the ranking of terms)

| Sonic train | Nickelodeon Sonic | Sonic Solutions |
|---|---|---|
| train 3.11 | channel 4.00 | company 3.66 |
| express 2.01 | network 3.63 | software 2.33 |
| rati 1.47 | brand 1.97 | firm 1.62 |
| service 1.36 | show 1.04 | provider 0.82 |
| jr 1.18 | cartoon 1.04 | cd 0.80 |
| bus 0.80 | country 0.80 | audio 0.79 |
| commuter 0.80 | platform 0.68 | dvd 0.64 |
| railway 0.78 | nickel 0.67 | manufacturer 0.64 |
| company 0.48 | tv 0.67 | vendor 0.48 |
| kam 0.46 | child 0.50 | studio 0.42 |
| Sonic Drive-in restaurant 3.17 | Sound frequency 3.37 | Sonic logging method 3.26 |
| fast 2.97 | wave 1.96 | tool 3.12 |
| chain 2.92 | source 1.80 | logging 2.59 |
| company 1.74 | medium 1.59 | technique 2.34 |
| drive 1.54 | object 1.49 | log 1.94 |
| brand 1.04 | signal 0.99 | well 1.56 |
| location 0.61 | audio 0.98 | instrument 1.05 |
| movie 0.50 | material 0.98 | fluid 0.65 |
| burger 0.30 | wavelength 0.83 | detector 0.65 |
| pizza 0.12 | vibration 0.64 | logger 0.65 |
| Chevrolet Aveo Sonic vehicle 3.50 | Sonic the Hedgehog game 3.56 | Sonic the Hedhehog (character) character 3.59 |
| model 3.37 | character 3.10 | game 2.11 |
| car 3.30 | classic 1.62 | hero 1.77 |
| brand 2.88 | video 1.37 | playable 1.50 |
| Chevrolet 2.80 | sega 1.35 | hedge 1.21 |
| gm 0.99 | title 0.85 | robot 1.08 |
| chevy 0.47 | hedge 0.79 | player 0.71 |
| op 0.28 | hero 0.68 | video 0.71 |
| ford 0.27 | playable 0.61 | classic 0.68 |
| japanese 0.21 | platform 0.44 | animal 0.50 |

Matcher 240 evaluates the level of evidence for an entity in a sentence. In the unary classification case, a user queries for an entity with a threshold level of confidence. This confidence threshold can have the default value 0.5, but can also be adjustable by users to control recall precision balance. For example if a user wants to find Sonic the Hedgehog (character) with the default threshold, the query can include the 10 words associated with the entity (obtained from entity definition database 230) and check if the calculated score (the normalized sum of the matching terms in the database) is above the threshold.

Consider the example sentence:

Do you want to go see Sonic? (=[character:0.26, robot: 0.03, animal:0.03, person:0.02, hero:0.02, game:0.02, random:0.02, creature:0.02, player:0.01, monster: 0.01])

And search for Sonic the Hedgehog (character)(=[character, game, hero, playable, hedge, robot, player, video, classic, animal])

The score can be
=(0.26+0.03+0.03+0.02+0.02+0.01)/(0.26+0.03+0.03+ 0.02+0.02+0.01+0.02+0.02+0.02+0.01)
=0.38/0.45
=0.84>0.5

And the sentence would be returned.

In the discriminatory classification case, the user can select a set of entities (or a default list is used) and desires to discriminate between entities instead of setting a threshold. A threshold can still be used. For example, the user may want to discriminate between Sonic the Hedgehog (character) and Sonic the Hedgehog with a confidence threshold of 0.5. The system in this case can calculate a score for each entity in the set and return the sentence only if the desired entity has the highest score and the confidence threshold is reached.

In this example, the score for Sonic the Hedgehog (=[game, character, classic, video, sega, title, hedge, hero, playable, platform]) can be
=(0.26+0.02+0.02)/(0.26+0.03+0.03+0.02+0.02+0.01+ 0.02+0.02+0.02+0.01)
=0.30/0.45=0.67
0.84>0.67, and the probability is 0.84/(0.84+0.67) =0.56>0.5

The sentence would again be returned.

Figure 4:
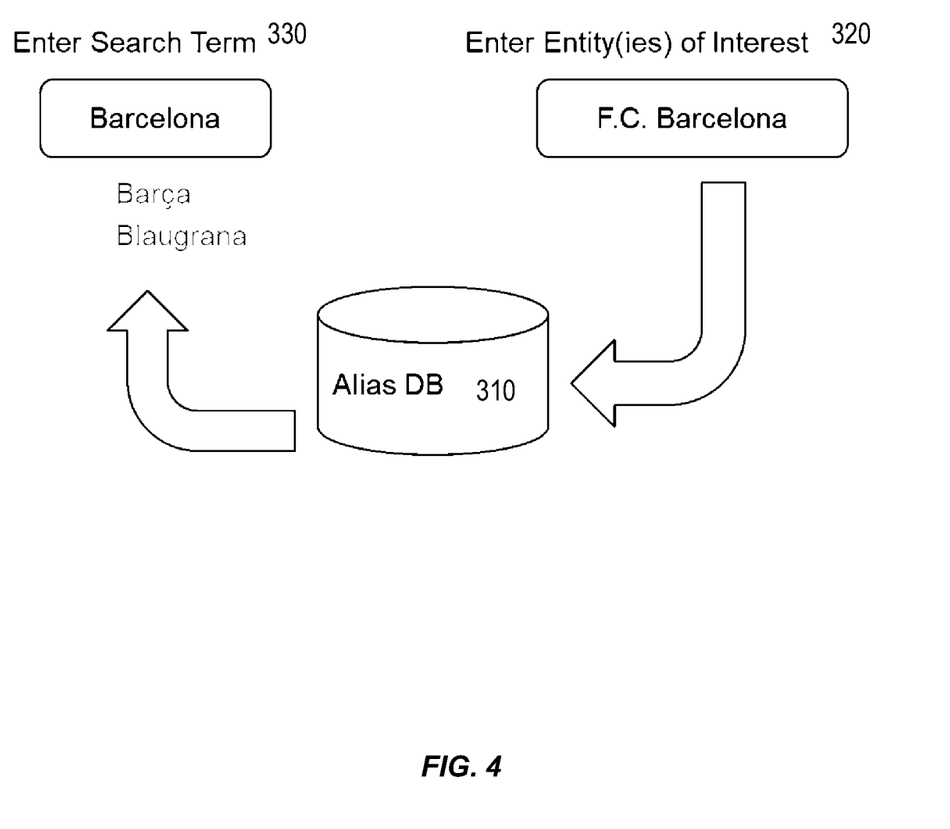
FIG. 4 illustrates an example alias database.

In some implementations, alias augmentation can be performed. For example, the user can interact with the ED system by specifying a search term, for example Barcelona. They can then choose which entity they want to search. A list of aliases can be suggested that the user can use to augment their original search term by using an Alias database. These new terms can be appended to the original query with an OR with user approval. FIG. 4 illustrates an example alias database 310. Entities of interest 320 can be entered, and the entity database 310 can provide new search terms 330.

In some implementations, in order to execute a search, a user can enter a search term. In the case of a unary search, after entering the search term the user can select one or more entities they are interested in. Scores can be calculated for every entity in this list, and the system can return results if the threshold for any entity in this list is greater than the input threshold.

Figure 5:
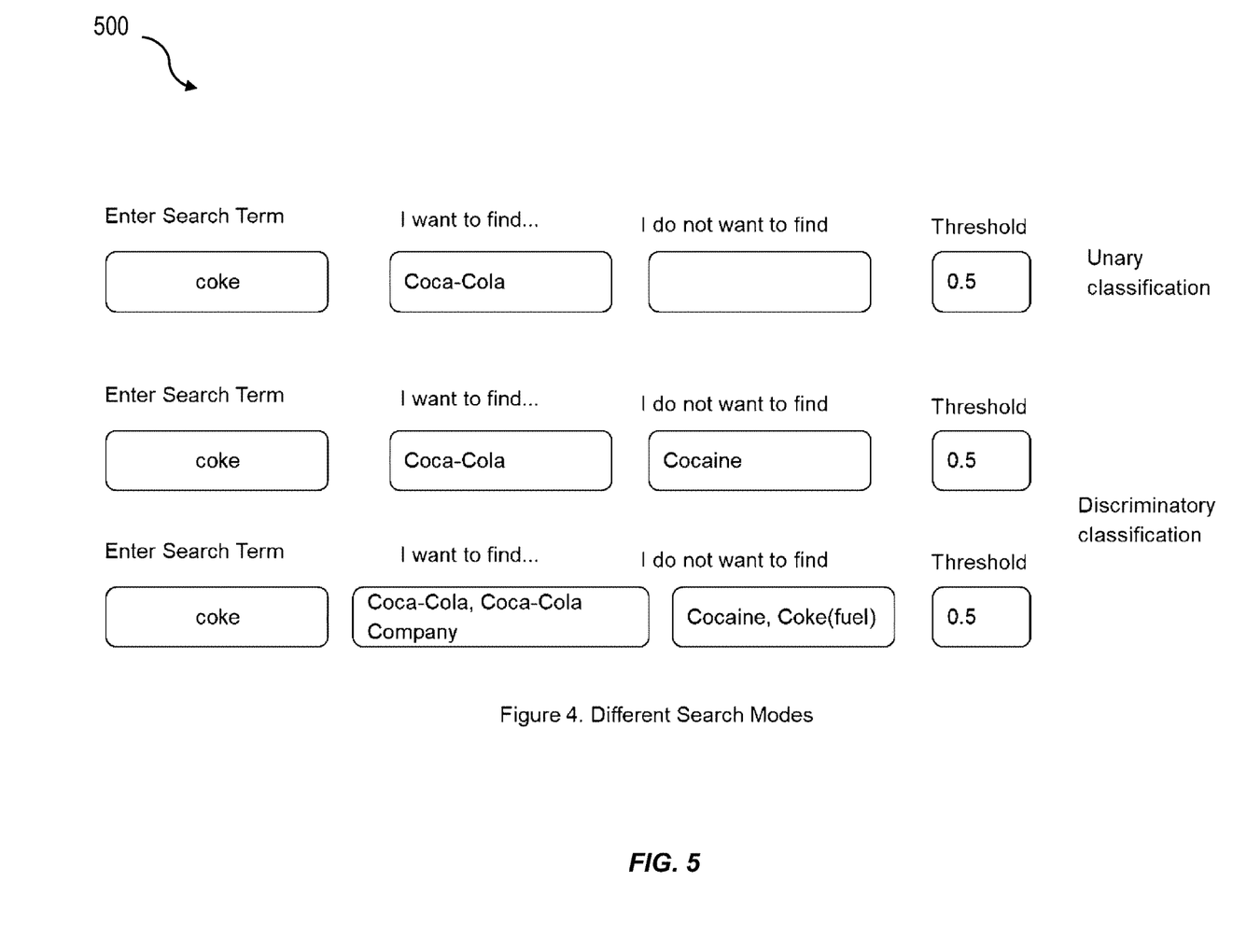
FIG. 5 illustrates example search modes.

In the case of a discriminatory search, the search can include entities that are not wanted in addition to entities desired. The system can return results if the winner in the discriminatory classification is one of the entities in the desired entity list. FIG. 5 illustrates example search modes 500.

In some implementations, the user can have the ability to scrutinize the words associated with an entity, for example, by double clicking, change the words, and use that in their search.

In some implantations, the user can search the context words associated with homonyms directly. For example, they can enter context words: deal, and this should bring every document where deal occurs inside the context words.

Figure 7:
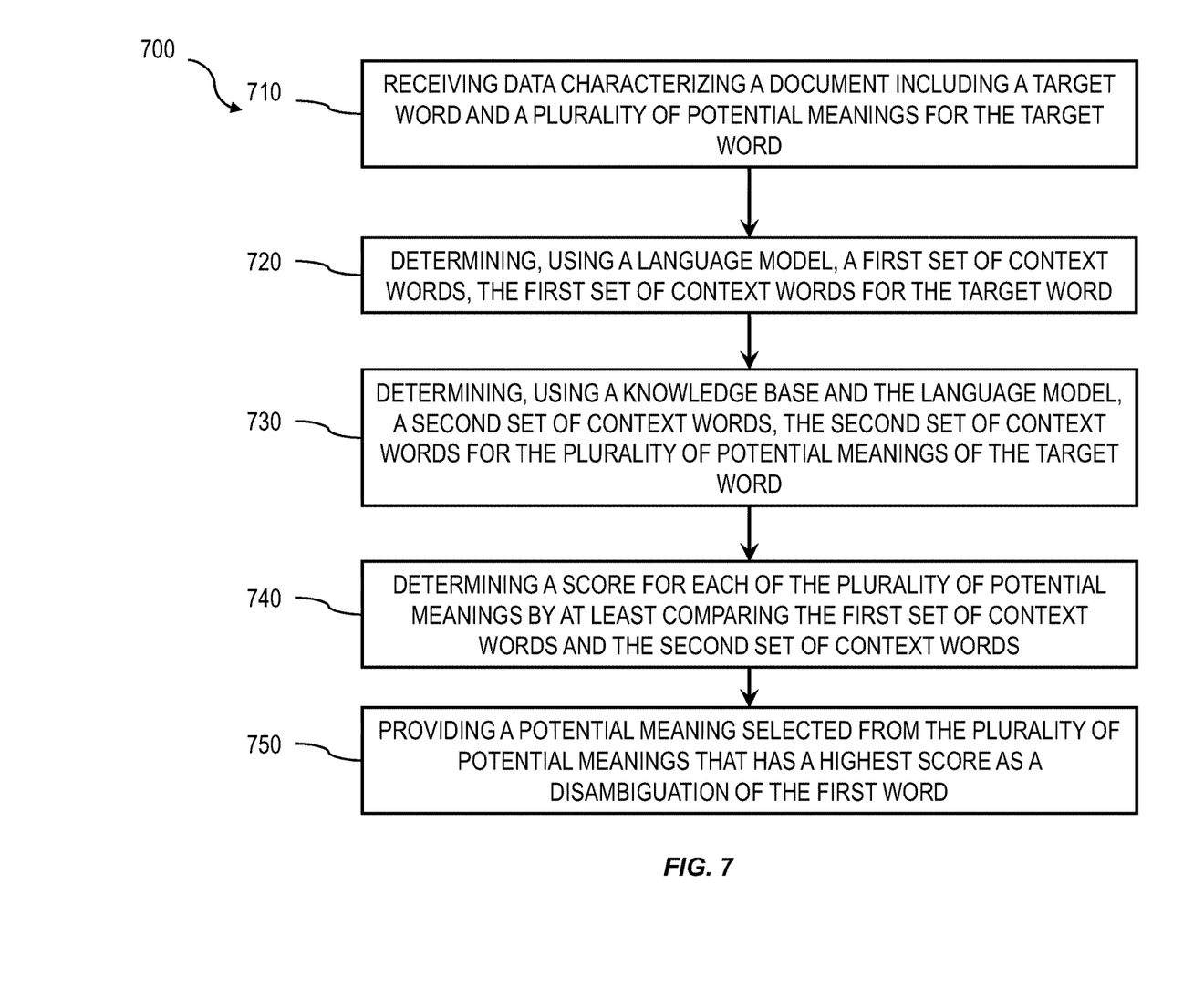
FIG. 7 is a process flow diagram illustrating an example method of disambiguating entities (also referred to as entity linking) that can enable more accurate disambiguation of entities, savings of computational resources, and reduction of storage requirements.

FIG. 7 is a process flow diagram illustrating an example method of disambiguating entities (also referred to as entity linking) that can enable more accurate disambiguation of entities, savings of computational resources, and reduction of storage requirements. At 710, data is received characterizing a document including a target word and a plurality of potential meanings for the target word. In some implementations, the plurality of potential meanings for the target word can be determined using a knowledge base.

At 720, a first set of context words for the target word is determined using a language model. Determining the first set of context words can include providing, to the language model, the document or a portion of the document along with a suffix. This can induce the language model to characterize the target word.

The determining the first set of context words can include providing, to the language model, the document or a portion of the document in which the target word is masked. This can induce the language model to output replacement words for the target word. In some implementations, each context word in the first set of context words is represented as a vector.

At 730, a second set of context words is determined using a knowledge base and the language model. The second set of context words is for the plurality of potential meanings of the target word. The second set of context words can be determined using input sentences and the language model.

At 740, a score is determined for each of the plurality of potential meanings by at least comparing the first set of context words and the second set of context words. The determining the score for each of the plurality of potential meanings can include clustering context words of the first set of context words and clustering the second set of context words to determine a similarity between the target word and each of the plurality of potential meanings.

At 750, a potential meaning selected from the plurality of potential meanings that has a highest score is provided as a disambiguation of the first word.

In some implementations, the first set of context words can be stored in a database. The determining the second set of context words and/or the determining the score for each of the plurality of potential meanings can be performed after receiving a query by a user for a disambiguation of the target word.

Figure 8:
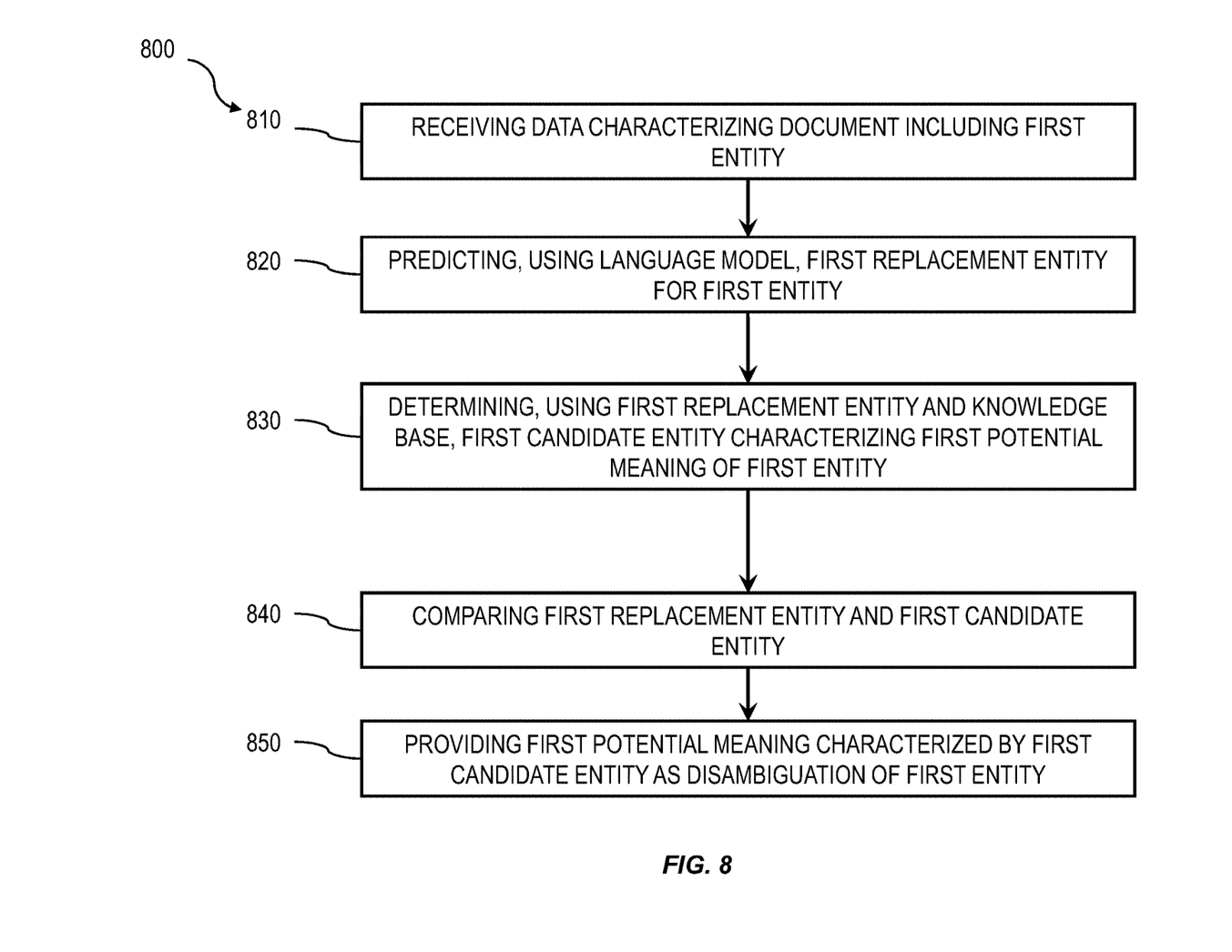
FIG. 8 is a data flow diagram illustrating an example method of disambiguating entities according to some example implementations of the current subject matter.

FIG. 8 is a data flow diagram illustrating an example method 800 of disambiguating entities according to some example implementations of the current subject matter.

At 810, data is received characterizing a document including a first entity. The document can include, for example, text including a target word (e.g., the document can include the text "Do you want to go see Sonic?"). The document can include a left context and a right context, the left context including entities in the document preceding the first entity, the right context including entities in the document succeeding the first entity.

At 820, a first replacement entity for the first entity can be determined using a language model. In some implementations, the first replacement entity can correspond to a first replacement entity word vector. The language model can trained on a corpus. The language model can include a staggered bidirectional language model trained on a large corpus and the first replacement entity can be predicted to complete a phrase including the left context followed by the first replacement entity followed by the right context.

At 830, a first candidate entity characterizing a first potential meaning of the first entity can be determined using the first replacement entity and a knowledge base. The knowledge base can include, for example, Wikipedia. In some implementations, the first candidate entity can correspond to a first candidate entity word vector. The first candidate entity word vector can be associated with a dominate candidate cluster based on a proximity of the first candidate entity word vector within a word vector space.

At 840, the first replacement entity and the first candidate entity can be compared. In some implementations, the comparing (also referred to as matching) can be performed within the word vector space. The comparing can include comparing the first replacement entity word vector and the first candidate entity word vector associated with the dominant candidate cluster.

At 850, the first potential meaning characterized by the first candidate entity as a disambiguation of the first entity can be provided. Providing can include displaying and/or further processing the disambiguation.

In some implementations, the first replacement entity word vector can be generated using the first replacement entity. The first candidate entity word vector can be generated using the first candidate entity. The first replacement entity word vector and the first candidate entity word vector can be graphed within the word vector space. The first candidate entity word vector can be clustered, using a graph clustering algorithm, into a first candidate cluster.

In some implementations, a set of candidate entities including the first candidate entity and corresponding to a set of candidate entity word vectors can be determined using the first replacement entity and the knowledge base. It can be determined that the first candidate cluster is the dominant candidate cluster based on the proximity of the first candidate entity word vector to other candidate entity word vectors in the set of candidate entity word vectors. The first potential meaning characterized by the first candidate can be associated with the dominant candidate cluster.

In some implementations, the graph clustering algorithm can include agglomerative algorithms, divisive algorithms, relocation algorithms, probabilistic clustering, k-medoids algorithms, k-means algorithms, density-based connectivity clustering, density functions clustering, grid-based clustering, subspace clustering, and/or co-clustering.

In some implementations, a first distance between the first replacement entity word vector and the first candidate entity word vector can be determined. The first distance can be less than distances between the first replacement entity word vector and the other candidate entity word vectors in the dominant candidate cluster. The first potential meaning associated with the dominant candidate cluster can be provided as the disambiguation of the first entity in response to determining the first distance is less than the distances.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving, using at least one data processor, data characterizing a document including a target word and a plurality of potential meanings for the target word;
   determining using the at least one data processor, using a language model, a first set of context words for the target word and a second set of context words for the plurality of potential meanings of the target word;
   storing the first set of context words and the second set of context words in an index;
   receiving a query for disambiguation of the target word;
   retrieving, responsive to the receiving of the query for the disambiguation of the target word, the first set of context words and the second set of context words from the index;
   determining, after the receiving of the query, using the at least one data processor, a score for each of the plurality of potential meanings by at least comparing the first set of context words and the second set of context words retrieved from the index;
   providing, using the at least one data processor, a potential meaning selected from the plurality of potential meanings that has a highest score as the disambiguation of the target word, wherein the providing including at least one of displaying, storing, further processing, and/or transmitting.

2. The method of claim 1, wherein the determining the first set of context words includes:
   providing, to the language model, the document or a portion of the document along with a suffix, wherein the language model characterizes the target word.

3. The method of claim 1, wherein the determining the first set of context words includes:
   providing, to the language model, the document or a portion of the document in which the target word is masked, wherein the language model outputs replacement words for the target word.

4. The method of claim 3, wherein each context word in the first set of context words is represented as a vector.

5. The method of claim 4, wherein the determining the score for each of the plurality of potential meanings by at least comparing the first set of context words and the second set of context words includes clustering context words of the first set of context words and clustering the second set of context words to determine a similarity between the target word and each of the plurality of potential meanings.

6. The method of claim 1, further comprising:
   determining, using a knowledge base, the plurality of potential meanings for the target word.

7. The method of claim 1, wherein the second set of context words is determined using input sentences and the language model.

8. A system comprising:
   at least one data processor; and
   memory storing executable instructions which, when executed by the at least one data processor, causes the at least one data processor to perform operations comprising:
   receiving data characterizing a document including a target word and a plurality of potential meanings for the target word;
   determining, using a language model, a first set of context words for the target word and a second set of context words for the plurality of potential meanings of the target word;
   storing the first set of context words and the second set of context words in an index;
   receiving a query for disambiguation of the target word;
   retrieving, responsive to the receiving of the query for the disambiguation of the target word, the first set of context words and the second set of context words from the index;
   determining, after the receiving of the query, a score for each of the plurality of potential meanings by at least comparing the first set of context words and the second set of context words retrieved from the index;
   providing a potential meaning selected from the plurality of potential meanings that has a highest score as the disambiguation of the target word, wherein the providing including at least one of displaying, storing, further processing, and/or transmitting.

9. The system of claim 8, wherein the determining the first set of context words includes:
   providing, to the language model, the document or a portion of the document along with a suffix, wherein the language model characterizes the target word.

10. The system of claim 8, wherein the determining the first set of context words includes:
    providing, to the language model, the document or a portion of the document in which the target word is masked, wherein the language model outputs replacement words for the target word.

11. The system of claim 10, wherein each context word in the first set of context words is represented as a vector.

12. The system of claim 11, wherein the determining the score for each of the plurality of potential meanings by at least comparing the first set of context words and the second set of context words includes clustering context words of the first set of context words and clustering the second set of context words to determine a similarity between the target word and each of the plurality of potential meanings.

13. The method of claim 1, wherein the determining of the score for each of the plurality of potential meanings comprises:
  delaying the determining of the score for each of the plurality of potential meanings, using the first set of context words, until the receiving of the query.

14. The system of claim 8, wherein the operations further comprising:
  the determining the score for each of the plurality of potential meanings is performed after receiving the query for the disambiguation of the target word.

15. The system of claim 14, wherein the determining the score for each of the plurality of the potential meanings comprises:
  delaying the determining of the score for each of the plurality of potential meanings, using the first set of context words, until the receiving of the query.

* * * * *